Patented Apr. 1, 1947

2,418,426

UNITED STATES PATENT OFFICE 2,418,426

COPOLYMERS OF VINYL THIOLESTERS AND ESTERS OF 1,4-BUTENEDIOIC ACIDS

Lawrence Marion Richards, Wilmington, Del., assignor to E. I. du Pont de Nemours & Company, Wilmington, Del., a corporation of Delaware No Drawing. Application July 30, 1943,
Serial No. 496,765

16 Claims. (Cl. 260—78)

This invention relates to polymeric materials and to methods for their preparation.

It is an object of this invention to provide new polymers of vinyl thiolesters with esters of 1,4-butenedioic acids. It is another object to provide methods for producing such polymers. It is a more specific object to provide polymers of vinyl thiolacetate with esters of 1,4-butenedioic acids.

The above objects are accomplished according to the present invention by polymerizing a monomeric vinyl thiolester with a monomeric ester of a 1,4-butenedioic acid. If desired the polymerization may be carried out in the absence of a solvent or diluent for either the monomer or polymer, in the presence of a solvent for the monomer or polymer, or in a medium which is a non-solvent for the monomer.

In one form of practicing the invention the monomeric vinyl thiolester and the ester of the 1,4-butenedioic acid are mixed and to the mixture is added from 0.01 to 10% of a dialkyl dioxide. The mixture is then heated in the absence of air for from 2 to 48 hours at a temperature in the range of 50° to 200° C., and preferably in the range of 80° to 150° C. The products obtained thereby are hard and colorless.

If desired the polymerization can be carried out in the presence of a solvent for the monomers and the resulting polymer or in an aqueous system containing a small amount of a dispersing or granulating agent. From the solution or dispersion the polymer may be recovered by evaporation of the solvent or dispersing medium.

The polymerization can also be carried out using ultraviolet light in conjunction with either benzoin or diacetyl as the catalyst. The acyl peroxides can also be used as catalysts but are less desirable than either the dialkyl dioxides or the benzoin-light or diacetyl-light combinations.

Bulk or solution polymerization is readily accomplished by exposing a mixture of the vinyl thiolester and the ester of 1,4-butenedioic acid containing from 0.01 to 1% of benzoin or diacetyl, based on the total weight of the monomers, to a source of ultraviolet light for from 1 to 12 hours at a temperature of from 0° to 100° C. in the absence of oxygen.

Granulation and emulsion polymers are formed by irradiating and stirring, under a non-oxidizing atmosphere, a monomer mixture containing from 0.1 to 1% of benzoin or diacetyl with an equal or greater volume of a water solution, based on the total monomer content, containing a granulating agent, i. e., polymethacrylic acid or an emulsifying agent, i. e., sodium salt of a sulfonated acid refined mineral oil dissolved therein. A temperature of from 25° to 100° C. is suitable and an irradiation period of 1 to 10 hours is generally sufficient. The granules or powder so produced may be hot pressed into films or dissolved in a suitable solvent and used as a coating material.

The examples which follow are submitted to illustrate and not to limit this invention. Quantities are by weight unless otherwise specified.

Example I

A mixture of 70 parts of vinyl thiolacetate

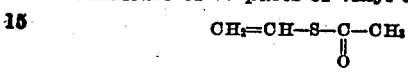

and 50 parts of diethyl fumarate containing 0.5% by weight of benzoin is irradiated at 25° C. for 15 hours. One hundred parts of the polymer thus obtained is dissolved in 900 parts of benzene, the solution is diluted with an equal volume of anhydrous methanol, and while at the boiling point there is added 32 parts of potassium hydroxide in 150 parts of methanol. The methyl acetate formed by ester interchange is removed by distillation. The viscous syrup remaining in the flask is treated with 27 parts of potassium hydroxide in water and distilled to a vapor temperature of 90° C. To the clear, light yellow syrup sufficient water is added to give a solution containing 5 to 10% of polymer. Addition of a 2% hydrogen peroxide solution brings about gelation and addition of hydrochloric acid to the solution causes the polymer to precipitate as a white powder. Analysis of the product shows it to contain 18.5% sulfur, which indicates a polyvinyl thiol content of about 34.6% in the hydrolyzed product. The material dissolves readily in dilute aqueous alkali hydroxide solutions.

The above experiment is repeated using a mixture of 90 parts of vinyl thiolacetate and 10 parts of dimethyl fumarate containing 0.3% benzoin. The mixture is exposed to bright sunlight for 4 hours. The product obtained is colorless and glass-like. Analysis of the product shows it to contain 27% sulfur, which corresponds to a vinyl thiolacetate content of 85.7%.

Example II

A mixture of 80 parts of vinyl thiolacetate, 20 parts of diethyl maleate and 0.5 part of benzoin is irradiated under nitrogen with a commercial 100 watt mercury arc for 48 hours. A clear, light yellow polymer is produced analyzing 24.6% sulfur, which indicates a vinyl thiolacetate content in the polymer of 78.5%.

The above experiment is repeated using 50 parts of maleic anhydride, 100 parts of vinyl thiolacetate, and 0.5 parts of benzoin. The product is resistant to the action of hydrocarbon solvents.

*Example III*

A mixture of 70 parts of vinyl thiolacetate, 30 parts of diethyl fumarate and 0.5 part of diacetyl is suspended in 90 parts of copper-free water containing 10 parts of a 1% polymethacrylic acid solution, 1 part of potassium dihydrogen phosphate, and enough 1 N potassium hydroxide to adjust the pH to 6. The mixture is agitated under nitrogen and exposed to a source of ultraviolet light at a distance of 4" for 5 hours at 70° to 80° C. The suspension is cooled and the granules separated. The product consists of 85 parts of a hard, colorless resin analyzing 21.6% sulfur which corresponds to 68.9% of vinyl thiolacetate in the polymer. The product yields clear, colorless films by hot pressing at 120° C. under 1000 lbs./sq. in. pressure.

To a mixture of 40 parts of vinyl thiolacetate, 10 parts diethyl fumarate, and 0.25 part of diacetyl there is added a solution of 6.3 parts of the sodium salt of a sulfonated acid-refined mineral oil and 0.5 part of potassium dihydrogen phosphate in 94 parts of copper-free water with enough 1 N potassium hydroxide to adjust the pH of the solution to 6. The mixture is irradiated with ultraviolet light for 7 hours at 60° to 70° C. in the manner described above. The emulsion is steamed to remove traces of residual monomers, cooled to 40° C. and coagulated by addition of 20 parts of a 7% solution of aluminum sulfate. The polymer which separates is filtered, washed, and dried. Forty parts of a colorless resin are obtained which analyzes 23.1% sulfur. This corresponds to a vinyl thiolacetate content in the polymer of 73.5%.

*Example IV*

A mixture of 7 parts of vinyl thiolacetate, 3 parts of diethyl fumarate and 0.1 part of diethyl dioxide is heated at 100° C. for 4 hours. The product obtained is hard and colorless.

The above experiment is repeated except that the polymerization is carried out in the presence of 5 parts of benzene. The resulting product is a viscous solution of polymer.

A mixture of 7 parts of vinyl thiolacetate, 3 parts of citraconic anhydride and 0.1 part of diethyl dioxide is exposed for 40 hours at 100° C., under nitrogen, to ultaviolet light. The product obtained is a hard colorless resin.

In place of the vinyl thiolacetate of the examples there can be used any vinyl carbo-thiolic acid ester. Suitable examples are the esters of vinyl mercaptan wherein the mercaptan hydrogen is replaced by the acyl radical of formic, caproic, stearic, benzoic, phenylacetic, furoic, quinolinic, lactic, chloroacetic, and the like acids. The preparation of these esters is disclosed and claimed in Brubaker U. S. Patent 2,378,535. Vinylesters of alphatic monocarbo-thiolic acids are preferred.

In place of the 1,4-butenedioic acid esters of the examples there may be used such esters as diisobutyl fumarate, dioctyl fumarate, dimethyl maleate, dilauryl maleate, methyl ethyl fumarate, methyl octyl maleate, dimethyl and diethyl mesaconates, dimethyl and diethyl citraconates, diphenyl fumarate, dibenzyl fumarate, dicyclohexyl fumarate, and the like. Alkyl esters are perferred. Anhydrides of these acids may also be copolymerized according to the process of the invention.

The products of this invention are adapted for use as coating compositions per se or in conjunction with other film forming materials. The copolymers may be hydrolyzed as indicated in Example I above. The hydrolyzed products are adapted for use in cationic exchange reactions and are suitable for water softening.

The above description and examples are intended to be illustrative only. Any modification of or variation therefrom which conforms to the spirit of the invention is intended to be included within the scope of the claims.

I claim:

1. Process for preparing copolymers which comprises exposing a mixture of 58 to 90 parts of a vinyl ester of a carbothiolic acid, 42 to 10 parts of a neutral ester of a saturated monohydric alcohol with 1,4-butenedioic acid, and an acyloin to ultraviolet light of such intensity and for a time sufficient to produce substantial polymerization.

2. Process of claim 1 wherein the esters are present in aqueous dispersion.

3. A polymerizate of a composition the polymerizable components of which consist of 58 to 90% of a vinyl thiolester of the formula $CH_2=CH-S-CO-R$ wherein $R-CO-$ is an acyl radical, the remainder being a neutral ester of a 1,4-butenedioic acid with a saturated monohydric alcohol.

4. A polymerizate of a composition the polymerizable components of which consist of 58 to 90% of a vinyl thiolester of the formula $CH_2=CH-S-CO-R$ wherein $R-CO-$ is an acyl radical, the remainder being a member of the class consisting of anhydrides of 1,4-butenedioic acids and neutral esters of said acids with saturated monohydric alcohols and monohydric phenols.

5. A polymerizate of a composition the polymerizable components of which consist of 58 to 90% of a vinyl thiolester of the formula $CH_2=CH-S-CO-R$ wherein $R-CO-$ is an acyl radical, the remainder being maleic anhydride.

6. A hydrolyzed polymerizate of a composition the polymerizable components of which consist of 58 to 90% of a vinyl thiolester of the formula $CH_2=CH-S-CO-R$ wherein $R-CO-$ is an acyl radical, the remainder being a neutral ester of a 1,4-butenedioic acid with a saturated monohydric alcohol.

7. Process for preparing copolymers which comprises polymerizing a mixture the polymerizable components of which consist of 58 to 90% of a vinyl thiolester of the formula $CH_2=CH-S-CO-R$ wherein $R-CO-$ is an acyl radical, the remainder being a member of the class consisting of anhydrides of 1,4-butenedioic acids and neutral esters of said acids with saturated monohydric alcohols and monohydric phenols.

8. A polymerizate of a composition the polymerizable components of which consist of 58 to 90% of a vinyl thiolester of the formula $CH_2=CH-S-CO-R$ wherein $R$ is an alkyl radical, the remainder being a neutral ester of a 1,4-butenedioic acid with a saturated monohydric alcohol.

9. A polymerizate of a composition the polymerizable components of which consist of 58 to 90% of vinyl thiolacetate, the remainder being diethyl fumarate.

10. A polymerizate of a composition the polymerizable components of which consist of 58 to 90% of vinyl thiolacetate, the remainder being a dialkyl fumarate.

11. A polymerizate of a composition the polymerizable components of which consist of 58 to 90% of vinyl thiolacetate, the remainder being a dialkyl ester of a 1,4-butenedioic acid.

12. A polymerizate of a composition the polymerizable components of which consist of 58 to 90% of vinyl thiolacetate, the remainder being a neutral ester of a saturated monohydric alcohol with a 1,4-butenedioic acid.

13. A polymerizate of a composition the polymerizable components of which consist of 58 to 90% of a vinyl ester of an aliphatic monocarbothiolic acid, the remainder being a neutral ester of a saturated monohydric alcohol with a 1,4-butenedioic acid.

14. A polymerizate of a composition the polymerizable components of which consist of 58 to 90% of a vinyl ester of an aliphatic monocarbothiolic acid, the remainder being a dialkyl ester of a 1,4-butenedioic acid.

15. A polymerizate of a composition the polymerizable components of which consist of 58 to 90% of vinyl thiolacetate, the remainder being maleic anhydride.

16. A hydrolyzed polymerizate of a composition the polymerizable components of which consist of 58 to 90% of vinyl thiolacetate, the remainder being a dialkyl fumarate.

LAWRENCE MARION RICHARDS.

REFERENCES CITED

The following references are of record in the file of this patent:

UNITED STATES PATENTS

| Number | Name | Date |
|---|---|---|
| 2,325,060 | Ingersoll | July 27, 1943 |
| 1,945,307 | Dykstra | Jan. 30, 1934 |

OTHER REFERENCES

Ellis, "Chemistry of Synthetic Resins," pgs. 240–241, vol. 1, pub. by Reinhold Pub. Corp. N. Y., 1935. (Copy in Division 50.)

Certificate of Correction

Patent No. 2,418,426.                                                April 1, 1947.

LAWRENCE MARION RICHARDS

It is hereby certified that error appears in the printed specification of the above numbered patent requiring correction as follows: Column 3, line 24, Example III, for "not pressing" read *hot pressing*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*